United States Patent [19]

Otsuki et al.

[11] 4,139,396

[45] Feb. 13, 1979

[54] WATER-SOLUBLE COATING COMPOSITION FOR CATHODE-PRECIPITATING ELECTRODEPOSITION AND PROCESS FOR ITS PREPARATION

[75] Inventors: Yutaka Otsuki, Yokohama; Yoshihiko Araki, Kawasaki; Kazuho Aoyama, Tokyo, all of Japan

[73] Assignee: Nippon Oil Company, Ltd., Tokyo, Japan

[21] Appl. No.: 817,538

[22] Filed: Jul. 20, 1977

[30] Foreign Application Priority Data

Jul. 29, 1976 [JP] Japan .................................. 51/89649
Mar. 24, 1977 [JP] Japan ........................... 52/31624[U]

[51] Int. Cl.² ...................... C08L 25/02; C08L 31/02; C08L 91/00
[52] U.S. Cl. ................................ 106/243; 260/18 EP; 260/29.2 EP
[58] Field of Search .................. 260/29.2 EP, 18 PN, 260/18 PF, 29.2, 23 EP, 18 EP; 106/243, 252

[56] References Cited

U.S. PATENT DOCUMENTS 3,367,991  2/1968  Hicks .............................. 260/18 EP

*Primary Examiner*—Theodore Morris
*Attorney, Agent, or Firm*—Wenderoth, Lind & Ponack

[57] ABSTRACT

A paint comprising as a film-forming component a resinous substance obtained by reacting epoxidized polybutadiene containing an unsaturated group and having a low degree of polymerization with a primary or secondary amine. The resinous substance can be easily rendered water-soluble, and is useful as water-base paints, particularly electrodeposition paints that deposit on a cathode. Instead of the epoxidized polybutadiene, epoxidized drying oils or semi-drying oils or epoxidized petroleum resins can also be used.

2 Claims, No Drawings

WATER-SOLUBLE COATING COMPOSITION FOR CATHODE-PRECIPITATING ELECTRODEPOSITION AND PROCESS FOR ITS PREPARATION

This invention relates to a water-soluble curable coating composition, especially a water-soluble curable coating composition suitable for electrodeposition coating of various objects which act as a cathode, and to a process for its production.

Conventional water-soluble paints, especially electrodeposition paints, are based on resins containing an acid group, for example maleinized oils, maleinized polybutadiene, alkyd resins, or acrylic resins containing acrylic acid or methacrylic acid as a copolymer component, which are rendered water-soluble by neutralization with bases such as ammonia, amines or potassium hydroxide.

The resins dissociate in water to give anions, and therefore, in electrodeposition, precipitate on an object to be coated which is an anode. Since in such a process a metal to be coated becomes an anode, it undergoes oxidation by oxygen generated as a result of electrolysis of water, and partly dissolves in the aqueous solution. A part of the metal that has dissolved remains in the resulting electrodeposited coating, and colors it. For example, if the object to be coated is made of iron, it changes the color of a white paint to brown; and if it is made of aluminum, it colors the paint yellow. Furthermore, metallic ion remaining in the coating markedly reduces the corrosion resistance of the coating. The paint solution is also contaminated by the dissolved ion, and the stability of the electrodeposition bath is considerably impaired.

The above dissolving and contamination occur similarly when the metal to be coated is treated with a phosphate for rust-proofness, and the phosphate coating formed is dissolved and drastically decreases in rust-proofing effect. Furthermore, coatings of a paint of this type do not possess sufficient alkali resistance.

If an object to be coated can be used as a cathode in electrodeposition, the dissolving of the metal from the coated article or the dissolving of its surface coating will not occur, and therefore, a coating having good corrosion resistance will be obtained without the coloration of the coating by the dissolved metal ion. In addition, this electrodeposition process is applicable to metals which cannot be satisfactorily coated by the anode-precipitating electrodeposition method because of their tendency to dissolve.

In order to perform an electrodeposition method using a coating object as a cathode, it is necessary to use a water-soluble resin which becomes a cationic resin in water and precipitates on the cathode.

Various investigations have been made about the method for producing water-soluble resins that will precipitate on a cathode, and resulted, for example, in modified epoxy resins (Japanese Patent Publications Nos. 23807/74 and 31736/74), and modified acrylic resins obtained by radical-copolymerization of acrylic monomers containing a tertiary amino group such as

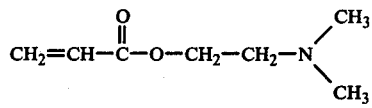

with various acrylic monomers or other monomers (Japanese Patent Publication Nos. 37147/73, 12396/70, 12395/70, and 39351/70).

These conventional electrodeposition paints that will precipitate on a cathode have various defects such as a high curing temperature or a low degree of curing, and have not gained commercial acceptance.

Coatings of water-soluble paints are required to be cross-linked by some means because they are readily soluble in water. Usually, this is accomplished by baking the coating at 150 to 200° C. for about 30 minutes after coating. In order to meet this requirement, the conventional practice has relied, for example, on a method involving mixing or pre-condensing water-soluble paints with a melamine-formaldehyde resin or a phenol-formaldehyde resin, or a method involving modifying them with drying oils. These methods, however, are not applicable to cathode-precipitating electrodeposition paint resins because they do not contain an acid group, and therefore, cannot be cured sufficiently with the melamine-formaldehyde resin or phenol-formaldehyde resin, or the composition of the coating varies.

For use in electrodeposition, any such water-soluble basic resin that precipitates on a cathode must afford a good coating having superior properties; otherwise, they would be low in practical value as electrodeposition resins. Furthermore, paints based on such resins must have sufficient stability not only in low concentrations after dilution or in usual concentrations before dilution, but also during storage or transportation.

It is an object of this invention therefore to provide a curable water-soluble resin which is free from the defects of the conventional resins described above, has improved curability, and can be readily made water-soluble.

Another object of this invention is to provide a coating composition having high storage stability which can afford a coating having superior resistance to external mechanical forces such as impact or bending, and superior chemical resistance such as resistance to alkali, water or solvent.

We made extensive investigations in an attempt to achieve the above objects, and consequently found that cathode-precipitating resins having superior curability and capable of affording coatings of superior properties can be obtained by reacting resins resulting from the introduction of epoxy groups into high-molecular-weight compounds containing unsaturated groups, such as natural drying oils (e.g., linseed oil or tung oil), or a synthetic polymer containing a carbon-carbon double bond and having a low degree of polymerization (e.g., maleinized liquid polybutadiene), with primary amines or secondary amines. The reaction products with primary amines have more improved adhesion to the substrate and can be made water-soluble at high hydrogen ion concentrations.

The above objects can be achieved in accordance with this invention by a coating composition for cathode-precipitating electrodeposition consisting essentially of (1) a curable resinous film-forming component capable of being rendered water-soluble, said component consisting of an unsaturated organic compound having a molecular weight of 300 to 30,000 containing a carbon-carbon double bond in an amount corresponding to an iodine number of 50 to 500, said unsaturated organic compound being selected from the group consisting of (a) a polymer of a conjugated diolefin containing 4 to 8 carbon atoms, (b) a copolymer of at least two conjugated diolefins containing 4 to 8 carbon atoms, (c) a copolymer of at least one conjugated diolefin containing 4 to 8 carbon atoms and a vinyl monomer having an ethylenic unsaturation containing 2 to 20 carbon atoms, (d) a natural oil, (e) a natural fact and (f) a petroleum resin produced by cationic polymerization of petroleum cracking fractions containing 4 to 10 carbon atoms with a Friedel-Crafts catalyst, said unsaturated organic compound having bonded thereto, through a carbon-carbon bond, organic basic groups of the following formula in aqueous solutions when rendered water-soluble

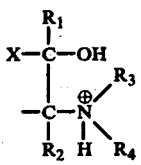
(I)

wherein $R_1$ and $R_2$, independently from each other, represent a hydrogen atom or a methyl group; $R_3$ and $R_4$ are the same or different organic groups containing 1 to 10 carbon atoms, and either one of $R_3$ and $R_4$ may be a hydrogen atom; X represents a hydrogen atom or a bond, and when X is a bond, the carbon atom to which $R_1$ is attached and the carbon atom to which $R_2$ is attached both can form a part of the main chain, the amount of said organic basic groups being 0.2 to 0.4 mole per 100 g of the film-forming component, and (2) an aqueous or organic liquid medium, said film-forming component being rendered water-soluble by neutralization with a water-soluble inorganic or organic acid.

The resin containing a carbon-carbon double bond and groups of formula (I), which constitutes the film-forming component of the coating composition of this invention, is a novel high-molecular-weight compound. This compound can be produced by reacting (A) an unsaturated organic compound having a molecular weight of 300 to 30,000 containing a carbon-carbon double bond in an amount corresponding to an iodine number of 50 to 500, said unsaturated organic compound being selected from the group consisting of (a) a polymer of a conjugated diolefin containing 4 to 8 carbon atoms, (b) a copolymer of at least two conjugated diolefins containing 4 to 8 carbon atoms, (c) a copolymer of at least one conjugated diolefin containing 4 to 8 carbon atoms and a vinyl monomer having an ethylenic unsaturation containing 2 to 20 carbon atoms, (d) a natural oil, (e) a natural fact and (f) a petroleum resin produced by cationic polymerization of petroleum cracking fractions containing 4 to 10 carbon atoms with a Friedel-Crafts catalyst, said unsaturated organic compound having bonded thereto, through a carbon-carbon bond, epoxy groups of the formula

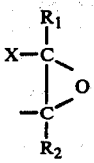
(II)

wherein X, $R_1$ and $R_2$ are as defined hereinabove, with (B) a primary or secondary amine compound of the formula

(III)

wherein $R_3$ and $R_4$ are as defined hereinabove, at a temperature of 100 to 200° C. to form a resinous substance containing basic groups and hydroxy groups, adding a water-soluble inorganic or organic acid to the resinous substance to render the resinous substance water-soluble, and mixing the resulting water-soluble resinous substance with an aqueous or organic liquid medium; or performing the above reaction in the presence of the liquid medium.

The epoxy modified resinous substance contains a main chain derived from an unsaturated organic compound or unsaturated group-containing liquid or solid polymer having a number average molecular weight (to be referred) to simply as molecular weight) of 300 to 30,000 and containing a carbon-carbon double bond in an amount corresponding to an iodine number of 50 to 500, preferably 100 to 470.

Examples of such an unsaturated organic compound are natural oils and fats such as linseed oil, tung oil, soybean oil or dehydrated castor oil, and stand oils prepared by heat-treating such natural oils and fats to increase their molecular weights. Examples of the unsaturated group-containing liquid or solid polymer are polymers having low degrees of polymerization of conjugated diolefins usually containing 4 to 8 carbon atoms such as butadiene, isoprene or piperylene, copolymers having low degrees of polymerization of two or more of these conjugated dienes, and copolymers having low degrees of polymerization of at least one of these conjugated olefins and a vinyl monomer having an ethylenic unsaturation usually containing 2 to 20 carbon atoms, especially, aliphatic or aromatic vinyl monomers such as isobutylene, diisobutylene, acrylic or methacrylic acid or the esters thereof, allyl alcohol or its esters, styrene, a-methylstyrene, vinyltoluene, or divinylbenzene. These compounds can be used either alone or as admixtures of two or more.

These polymers with low degrees of polymerization can be produced by known methods. A typical method comprises the anionic-polymerization of conjugated diolefins containing 4 or 5 carbon atoms either alone, or as mixtures with each other, or with an aromatic vinyl monomer such as styrene, α-methylstyrene, vinyltoluene or divinylbenzene in an amount of not more than 50 mole % at a temperature of 0 to 100° C. in the presence of an alkali metal or organic alkali metal compound as a catalyst. In order to control the molecular weight and obtain a light-colored low polymer with a reduced gel content, it is convenient to employ a chain-transfer polymerization method using an organic alkali metal compound such as benzyl sodium as a catalyst and a compound containing an alkylaryl group such as toluene as a chain-transfer agent (U.S. Pat. No. 3,789,090), a living polymerization method carried out in a tetrahydrofuran solvent using a polynuclear aromatic compound such as naphthalene as an activator and an alkali metal such as sodium as a catalyst (Japanese Patent Publications Nos. 17485/67 and 27432/68), and a method in which an aromatic hydrocarbon such as toluene or xylene is used as a solvent and a dispersion of a metal such as sodium in an organic solvent is used as a catalyst, and the molecular weight of the polymer is controlled by adding an ether such as dioxane (Japanese Patent Publications Nos. 7446/57, 1245/58, and 10188/59). The polymers having a low degree of polymerization can also be produced by coordination anionic polymerization using an acetylacetonate compound of a metal of Group VIII of the periodic table, such as cobalt or nickel, and an alkylaluminum halogenide as catalysts (Japanese Patent Publications Nos. 597/70 and 30300/71).

Furthermore, petroleum resins having an unsaturated group produced by cationic polymerization of petroleum cracking fractions containing 4 to 10 carbon atoms with a Friedel-Crafts catalyst such as aluminum chloride, boron trifluoride or a complex of these at 0 to 100° C., and a butadiene/isobutylene copolymer having a low degree of polymerization and prepared by using a similar catalyst can also be used as the main chain portion of the resins used in the present invention.

The natural oils and fats exemplified above have a molecular weight of 300 to 30,000, preferably 1,000 to 5,000, and the low polymers of conjugated dienes have a molecular weight of 300 to 30,000, preferably 1,000 to 5,000. If the molecular weight is larger than 30,000, these compounds have poor solubility in water, and if it is less than 300, coatings obtained from these compounds have too low a strength to be practical.

The above natural oils and fats and the conjugated diolefin polymers or copolymers having low degrees of polymerization have an iodine number of 50 to 500, preferably 100 to 470. If the iodine number is less than 50, the curability of these compounds is poor, and if it exceeds 500, they have poor storage stability.

The "iodine number", as referred to in the present application, is measured by the following method disclosed in A. Kemp and H. Peters, Ind. Eng. Chem., Anal., Ed. 15, 453 (1943). About 0.1 g of a sample is collected in a flask for iodine number measurement, and 100 ml of chloroform and 100 g of p-dichlorobenzene are added to dissolve the sample. Then, 60 ml of a 0.1N carbon tetrachloride solution of iodine monochloride is added, and reacted with the sample by shaking at room temperature for 1 hour. Then, 10 ml of a 10% aqueous solution of potassium iodide is added, and the mixture is shaken for 5 minutes. The resulting solution is then titrated with a 0.1N aqueous solution of sodium thiosulfate using starch as an indicator.

An epoxy group of general formula (II) may be introduced into the natural oils and fats, petroleum resins or conjugated diolefin low polymers or copolymers by known methods of reacting peracetic acid at 0 to 100° C. (Japanese Patent Publications Nos. 3239/58, 3240/58, and 15107/62).

The amount of the epoxy groups of formula (II) is 0.02 to 0.4 mole, preferably 0.05 to 0.2 mole, per 100 g of the resin.

If the amount of the epoxy groups is smaller than 0.02 mole per 100 g of the resin, the resin obtained by reacting with the primary or secondary amine compound has poor solubility even when neutralized with an acid. On the other hand, if the amount of the epoxy groups is larger than 0.4 mole, the resin becomes very soluble in water by the neutralization treatment, and has poor water resistance when painted, and cannot be used for practical application.

The hydrocarbon groups $R_3$ and $R_4$ in general formula (III) preferably have 2 to 6 carbon atoms. Examples of the amine compound of formula (III) include primary amines, for example, alkyl primary amines such as monomethylamine, monoethylamine, monopropylamine, monobutylamine, monohexylamine and monooctylamine, aromatic primary amines such as benzylamine, and primary alkanolamines such as monoethanolamine and monopropanolamine; and secondary amines such as dimethylamine, diethylamine, dipropylamine, dibutylamine, dihexylamine, dioctylamine, diethanolamine, and dipropanolamine.

The amount of the primary or secondary amine compound is preferably equimolar to the epoxy groups of the epoxy-modified resin (A). It is also possible to use it in excess and remove the excess by evaporation after the reaction. Alternatively, the primary of secondary amine may be used in a smaller amount than the equimolar amount to leave some of the epoxy groups unchanged.

The reaction of the high-molecular-weight compound (A) containing epoxy groups and a carbon-carbon double bond with the primary or secondary amine (B) is performed at a temperature of 50 to 200° C., preferably 100 to 150° C. in the presence or absence of a solvent. When the high-molecular-weight compound (A) has a low viscosity, it is preferred not to use a solvent. When the viscosity of the compound (A) is high, a solvent such as benzene, toluene, xylene, cyclohexane, methyl "Cellosolve" (ethylene glycol monomethyl ether), ethyl "Cellosolve" (ethylene glycol monoethyl ether), propyl "Cellosolve" (ethylene glycol monopropyl ether), butyl "Cellosolve" (ethylene glycol monobutyl ether), diethyl ether, glyme, and diglyme, may be used.

When a solvent is used, it is preferred economically to use a water-soluble solvent such as ethyl "Cellosolve", methyl "Cellosolve", butyl "Cellosolve", glyme or diglyme as a reaction solvent, and directly water-solubilize the product.

When the component (B) to be reacted with the high-molecular-weight compound (A) is a primary amine compound, water, phenol and an acid such as acetic acid may be added as a catalyst in order to promote the reaction.

A suitable method of solubilizing the resulting resin containing a carbon-carbon double bond, a secondary or tertiary amino group and a hydroxyl group is to neutralize it with an inorganic acid such as hydrochloric acid or sulfuric acid or a water-soluble acid such as formic acid, acetic acid, propionic acid or lactic acid in an amount of 0.2 to 1.0 mole equivalent based on the secondary or tertiary amino group.

The coating composition of this invention may be a solution or dispersion in water of a film-forming component containing a carbon-carbon double bond, basic groups and a hydroxyl group. It may also include a water-soluble organic solvent. For example, in order to facilitate the solubilization of water, increase the stability of the aqueous solution, improve the flowability of the resin and improve the smoothness of coated films, it is preferred to use 100 to 10 g, per 100 g of the resin, of an organic solvent which is water-soluble and can dissolve the resin in accordance with this invention. Examples of such organic solvents are ethyl "Cellosolve", propyl "Cellosolve", butyl "Cellosolve", ethylene glycol dimethyl ether, diethylene glycol dimethyl ether, diacetone alcohol, and 4-methoxy-4-methyl-pentanone-2.

The amount of the film-forming component of the coating composition of the present invention, namely the reaction product of component (A) and component (B) or its water-solubilized product, is not particularly limitative. Usually, it contains 100 parts by weight of the reaction product or water-solubilized product, up to 100 parts by weight of a solvent, up to 300 parts by weight of various pigments and up to 2,000 parts by weight of water. In the case of using the water-solubilized product, the content of water is preferably adjusted to 50 to 1,000 parts by weight.

Since a water-soluble paint prepared by adding a suitable pigment such as titania, red iron oxide or carbon black, or a rustproof pigment such as strontium chromate, to an aqueous solution prepared by neutralizing the imidization reaction product with a water-soluble acid is self-curable, it is not likely to cause non-uniformity of the bath composition which frequently becomes a problem with electrodeposition paints using multi-component resins containing other components for imparting heat curability. Furthermore, since this water-soluble paint precipitates on a cathode in electroposition, it is a very good water-soluble paint for electrodeposition which is free from the coloring of the coating, the unstability of the electrodeposition bath, and the reduced ability to inhibit rust formation.

In the present invention, a dryer such as cobalt naphthenate or manganese naphthenate can be added to lower the baking temperature or shorten the curing time.

The water-soluble self-curable resin in accordance with this invention can also be utilized in water-soluble paints applied by ordinary methods such as spraying or immersing, in addition to its utility in electrodeposition.

The following Examples and Comparative Examples further illustrate the present invention in greater detail. The properties of the coatings in these examples were measured in accordance with JIS K-5400.

EXAMPLE 1

A 30-liter autoclave was charged with 1 mole of benzyl sodium, 15 moles of toluene and 15 moles of n-hexane under a stream of nitrogen. After warming the solution to 30° C., 10 liters of butadiene was charged into it over the course of 2 hours while maintaining its temperature at 30° C. Methanol (200 ml) was added to stop the polymerization. Then, 1 kg of terra alba was added, and the mixture was vigorously stirred and filtered to afford an alkali-free clear polymer solution. By evaporation, the unreacted butadiene, toluene and n-hexane were removed from the polymer solution to afford polybutadiene (A) having an iodine number of 430, a 1,2-bond content of 65% and a number average molecular weight of 1,000.

A 5-liter three-necked flask equipped with a thermometer, a stirrer, a dropping funnel and a cooling device was charged with 1000 g of the polybutadiene (A) and 1500 ml of toluene, and they were mixed uniformly. Industrial-grade 40% peracetic acid (1375 g) which had been stabilized with dipicolic acid and to which 56 g of sodium acetate had been added was added dropwise to the mixture over the course of about 1 hour. During this time, the temperature of the mixture was maintained at 20 to 25° C. The mixture was then maintained at this temperature for 3 hours, and cooled to room temperature. The reaction mixture was carefully washed with distilled water, then with a saturated sodium chloride solution, and finally with a saturated sodium chloride solution containing potassium hydroxide to neutralize the residual acid in the mixture. The mixture was then filtered by a filter paper until the filtrate became clear. The excess of the solvent was removed at room temperature under a pressure of about 1 to 2 mmHg to afford epoxizied polybutadiene (A').

An analysis of this product showed that is contained 3.16% of oxygen ascribable to oxirane. The content of oxirane oxygen was measured by a method similar to the analytical method disclosed in Analytical Chemistry, Vol. 19, page 414, 1947.

A 5-liter separable flask was charged with 1000 g of epoxidized polybutadiene (A'), 500 ml of xylene and 255 g of dibutylamine, and they were heated at 100° C. for 2 hours. The unreacted dibutylamine and the xylene were distilled off under reduced pressure to afford polybutadiene (A") having a tertiary amino group and a hydroxyl group.

Then, 100 g of the polybutadiene (A") containing a tertiary amino group and a hydroxyl group was dissolved in 20 g of diethylene glycol dimethylene ether, a water-soluble solvent, and 30 g of titania, 1 g of carbon black and 1 g of strontium chromate were added. The mixture was neutralized with 4.6 g of acetic acid, and dissolved in distilled water to prepare an aqueous solution having a solids concentration of 12% by weight.

The aqueous solution was placed in a 1-liter beaker, and electrodeposited on a mild steel panel (treated with Bondelite No. 137; the product of Nippon Test Panel Co., Ltd.) as a cathode using a carbon electrode plate as an anode. The results are shown in Table 1.

COMPARATIVE EXAMPLE 1

A 2-liter autoclave was charged with 1,000 g of polybutadiene synthesized in Example 1, 150 g of maleic anhydride, 300 g of xylene and 2 g of Antigen 3C (a trademark for a product of Sumitomo Chemical Co., Ltd.), and they were reacted at 190° C., for 8 hours under a stream of nitrogen. The unreacted maleic anhydride and xylene were distilled off under reduced pressure to afford maleinized polybutadiene (A''') having an acid value of 70.

100 g of the maleinized polybutadiene (A''') was dissolved in diethylene glycol dimethyl ether, and 30 g of titania, 1 g of carbon black and 1 g of strontium chromate were added. The mixture was neutralized with an aqueous solution of potassium hydroxide, and dissolved in distilled water to afford an aqueous solution having a solids concentration of 12% by weight.

The aqueous solution was placed in a 1-liter beaker, and electrodeposited on a mild steel panel (treated with Bondelite No. 137; the product of Nippon Test Panel Co., Ltd.) as an anode using a carbon electrode plate as a cathode. The results are shown in Table 1.

A comparison of Example 1 with Comparative Example 1 in Table 1 shows that there are marked differences in electrodeposition characteristics and the properties of the coated films even when the same starting resins was used. It is clear that the coating obtained in Example 1 was tougher and had higher alkali resistance although its acid resistance somewhat decreased. This shows that very good coatings can be obtained by the method of this invention.

Table 1

|  | Example 1 | Comparative Example 1 |
|---|---|---|
| Coating conditions |  |  |
| Voltage (V) | 75 | 310 |
| Time (minutes) | 3 | 3 |
| Baking conditions |  |  |
| Temperature (°C.) | 200 | 160 |
| Time (minutes) | 3 | 3 |
| Coating thickness (microns) | 20 | 20 |
| Physical tests |  |  |
| Pencil hardness | H - 2H | 2H - 3H |
| Sketching | Good | Good |
| Crosscut test (tape test) | 100/100 | 90/100 |
| Erichsen (mm) (*1) | >9 | 4.5 |
| Impact strength (cm) (500g, 1/2B) |  |  |
| Top surface | >50 | 20 |
| Back surface | >50 | 10 |
| Flexural resistance (mm) (*2) | <2 | 6 |
| Chemical tests |  |  |
| Alkali resistance (hr) (*3) | >100 | 3.5 |
| Acid resistance (hr) (*4) | 72 | >100 |
| Water resistance (days) (*5) | >30 | >30 |
| Solvent resistance (days) (*6) | >30 | >30 |
| Corrosion resistance (mm) (*7) | <1 | 8 |

(*1): The maximum height at which the drop of a ball does not cause breakage of the coating in the extruded portion.
(*2): The minimum bending radius which causes cracks in the coating.
(*3): The time that elapses until a change, such as blistering, occurs in the coating (when immersed in 5% NaOH).
(*4): The time that elapses until a change such as blistering, occurs in the coating (when immersed in 5% $H_2SO_4$).
(*5): The time that elapses until a change, such as blistering, occurs in the coating (when immersed in distilled water at 40° C.).
(*6): The time that elapses until a change, such as blistering, occurs in the coating (when immersed in a 1/1 mixture of toluene andd xylene).
(*7): The maximum rust width from a cut portion provided in the coating (a spray of a 5% aqueous solution of NaCl, 300 hours).

EXAMPLE 2

Linseed oil having an iodine number of 180 and a molecular weight of about 800 was reacted with peracetic acid under the same conditions as in Example 1 to afford a product containing 3.2% of oxirane oxygen. Dioctylamine (480 g) was added to 1,000 g of the product, and the mixture heated at 80° C. for 2 hours to synthesize linseed oil containing a tertiary amino group and a hydroxyl group. 400 g of the linseed oil containing a tertiary amino group and a hydroxyl group was dissolved in 60 g of n-butyl "Cellosolve". The mixture was neutralized with 22.5 g of acetic acid and dissolved in distilled water to afford an aqueous solution containing a solids concentration of 30% by weight. The aqueous solution was very stable as demonstrated by the fact that on standing for three months, it did not change in viscosity, clarity and pH.

A 2-liter stainless steel beaker was charged with 600 g of the 30% aqueous solution, 570 g of titania, 24 g of carbon black, 180 g of aluminum silicate, 24 g of strontium chromate, and 1,000 g of glass beads. The contents were vigorously stirred for 2 hours by a highspeed rotary mixer. The glass beads were separated by filtration, and a pigment paste (A) having very good water-dispersibility was formed.

EXAMPLE 3

The air inside a 35-liter stainless steel equipped with a stirrer was replaced by nitrogen, and 8.1 kg of butadiene, 16 liters of toluene, 152 g of dioxane and 200 g of a dispersion of sodium were added. They were reacted at 80° C. for 2 hours. The catalyst was destroyed with water, and then the reaction mixture was neutralized with hydrochloric acid. Sodium chloride formed was removed from the reaction mixture by washing. Further, toluene was distilled off under reduced pressure to afford a butadiene polymer (B) in a yield of 86% based on the butadiene charged. The resulting butadiene polymer (B) had a number average molecular weight of 820, an iodine number of 420, a vinyl group content of 55%, a trans group content of 17%, a cis group content of 15%, and a viscosity of 7 poises (25° C.).

Then, 500 g of the polybutadiene (B) in 500 g of xylene was reacted in the same way as in Example 1 with 300 g of 40% peracetic acid which had been stabilized with dipicolic acid and to which 10 g of sodium acetate had been added. Epoxidized polybutadiene (B') containing 1.3% of oxirane oxygen was obtained.

In the same way as in Example 1, 200 g of epoxidized polybutadiene (B') was reacted with 17 g of diethanolamine to synthesize polybutadiene (B") containing a tertiary amino group and a hydroxyl group.

Acetic acid (2.5 g) was added to 100 g of the polybutadiene (B"), and the mixture dissolved in 20 g of butyl "Cellosolve" and pure water to afford a 20% by weight aqueous solution. Then, 63.1 g of the pigment paste produced in Example 2 was added, and after thorough mixing, distilled water was added to afford an electrodepositing solution having a solids concentration of 12%. The solution was placed in a 1-liter beaker made of polypropylene, and electrodeposited on a copper test panel having a length of 150 mm, a width of 50 mm and a thickness of 2 mm as a cathode using a carbon electrode plate as an anode while applying a dc voltage of 60 V for 3 minutes. The coating was baked at 200° C. for 30 minutes. The coating obtained was very pliable and had an excellent surface gloss. When the coating was immersed in water at 40° C. for 40 days, it did not show any change. The product is expected to be a very good insulating material because of the excellent electrical characteristics of polybutadiene.

EXAMPLE 4

A 20-liter autoclave was charged with 1.0 mole of benzyl sodium, 30 moles of toluene and 15 liters of benzene under a stream of nitrogen. After warming the contents to 30° C., 10 liters of butadiene was charged over the course of 4 hours while its temperature was maintained at 30° C. The catalyst was decomposed with water, and the catalyst residue was removed by washing with water. The toluene, benzene, and unreacted butadiene were distilled off to afford polybutadiene (C) having an iodine number of 400, a 1,2-bond content of 51% and a number average molecular weight of 680.

The polybutadiene (C) was reacted with peracetic acid in the same way as in Example 1 to afford epoxidized polybutadiene (C') containing 2.4% of oxirane oxygen.

Dipropylamine was reacted with the epoxidized polybutadiene in the same way as in Example 1 to afford polybutadiene (C") containing a tertiary amino group and a hydroxyl group. The product was neutralized with an aqueous solution of acetic acid, and 80 g of titania was added to prepare a water-soluble paint having a solids concentration of 45%. The paint had a very low viscosity. The water-soluble paint was coated on a polished mild steel panel (No. 280) by a 5-mil applicator, and baked at 200° C. for 30 minutes.

The coating had a thickness of 20 microns, and was very hard as shown by its pencil hardness of 2H. In view of the fact that the coating showed an Erichsen value of 9 mm and a Du Pont impact strength of more than 50 cm, it was very pliable and tough.

The paint had a viscosity of as low as about 100 KU, and had very good properties as a water-soluble baking paint.

EXAMPLE 5

Polybutadiene (D) having an iodine number of 450, a 1,2-bond content of 65% and a number average molecular weight of 2,000 was prepared in the same way as in Example 4 except that the amount of toluene was changed to 5 moles.

The polybutadiene (D) was reacted with peracetic acid in the same way as in Example 1 to afford epoxidized polybutadiene (D') containing 1.6% of oxirane oxygen.

300 g of the epoxidized polybutadiene (D') was reacted with 72 g of dioctylamine at 110° C. for 1.5 hours to afford polybutadiene (D") containing a tertiary amino group and a hydroxyl group. The polybutadiene (D") was dissolved in an aqueous solution of acetic acid to afford a 20% aqueous solution. To the resulting aqueous solution was added 631 g of the pigment paste (A) produced in Example 2. After through mixing, distilled water was added to prepare an electrodepositing solution having a solids concentration of 12%.

The electrodepositing solution was placed in a 1-liter beaker, and electrodeposited on a mild steel panel (treated with Bondelite No. 137; the product of Nippon Test Panel Co., Ltd.) as a cathode using a carbon electrode plate as an anode. The results are shown in Table 2.

EXAMPLE 6

An electrodepositing solution was prepared in the same way as in Example 5 except that Polybutadiene B-1000 (a product of Nippon Soda Co., Ltd.; having a 1,2-bond content of 90% and a number average molecular weight of 1,000) was used as the starting material. Using the resulting electrodepositing solution, electrodeposition coating was performed in the same way as in Example 5. The results are shown in Table 2.

EXAMPLE 7

An electrodepositing solution was prepared in the same way as in Example 5 except that Polyoil Huls 110 (polybutadiene having a cis-1,4 bond content of about 80%, a trans-1,4 bond structure of about 20% and a number average molecular weight of 1,700; a product of Huls Company) was used as the starting material. Using the electrodepositing solution, electrodeposition was performed in the same way as in Example 5. The results are shown in Table 2.

EXAMPLE 8

Linseed oil was heated at 280° C. for 8 hours under a stream of nitrogen to produce heat-treated linseed oil having a viscosity of 10 poises.

1,000 g of the heat-treated linseed oil was dissolved in 500 ml of toluene, and reacted with 300 g of 40% peracetic acid in the same way as in Example 1. Linseed oil obtained after purification contained 1.75% of oxirane oxygen.

Dioctylamine (120 g) was reacted with 500 g of the epoxidized linseed oil at 80° C. for 4 hours. The unreacted amine was distilled off to afford linseed oil containing a tertiary amino group and a hydroxyl group.

Polybutadiene (E) having an iodine number of 460, a 1,2-bond content of 80%, and a number average molecular weight of 3,600 was synthesized in the same way as in Example 4 except that the amount of toluene was changed to 2 moles. Then, in the same way as in Example 4, the polybutadiene (E) was reacted with peracetic acid to afford epoxidized polybutadiene (E') containing 1.7% of oxirane oxygen. Then, in the same way as in Example 5, polybutadiene (E") containing a tertiary amino group and a hydroxyl group was synthesized.

50 g of the linseed oil containing a tertiary amino group and a hydroxyl group and 50 g of the polybutadiene (E") containing a tertiary amino group and a hydroxyl group were dissolved in 20 g of diethylene glycol dimethyl ether. After thorough mixing, the solution was dissolved in an aqueous solution of acetic acid to afford a 20% aqueous solution. Then, 63.1 g of the pigment paste (A) produced in Example 2 was added, and after thorough mixing, distilled water was added to afford an electrodepositing solution having a solid concentration of 12%.

Electrodeposition coating was performed in the same way as in Example 5. The results are shown in Table 2.

Table 2

| Example | 5 | 6 | 7 | 8 |
|---|---|---|---|---|
| Coating conditions | | | | |
| Voltage (V) | 140 | 60 | 70 | 100 |
| Time (minutes) | 3 | 3 | 3 | 3 |
| Baking conditions (° C. × min.) | 200 × 30 | 200 × 3 | 200 × 30 | 200 × 30 |
| Coating thickness (microns) | 20 | 20 | 20 | 20 |
| Physical tests | | | | |
| Pencil hardness | 2H | F | B | 2B |
| Sketching | Good | Good | Good | Good |
| Crosscut test (tape test) | 100/100 | 99/100 | 98/100 | 98/100 |
| Erichsen (mm) | >9 | >9 | >9 | >9 |
| Impact strength (cm) | | | | |
| Top surface | >50 | >50 | >50 | >50 |
| Back surface | >50 | >50 | >50 | >50 |
| Flexural resistance (mm) | <2 | <2 | <2 | <2 |
| Chemical tests | | | | |
| Alkali resistance (hr) | >100 | 25 | 10 | 5 |
| Acid resistance (hr) | >100 | 40 | 30 | 6 |
| Solvent resistance (days) | >30 | >30 | >30 | 20 |
| Water resistance (days) | >30 | >30 | >30 | 15 |
| Corrosion resistance (mm) | 1 | 3 | 4 | 4 |

EXAMPLE 9

A cracking fraction having a boiling point of 20 to 80° C. resulting as a by-product from the steam cracking of naphtha was heated at 100° C. for 4 hours to demerize a major portion of the cyclopentadiene contained in it to dicyclopentadiene, and then re-distilled to obtain a fraction (a) having a boiling point of 20 to 80° C. and a fraction (b) having a boiling point of 140 to 220° C. A mixture of 75% by weight of fraction (a) and 25% by weight of fraction (b) (which was found by a gas-chromatographic analysis to contain 45.0% by weight of all the unsaturated components, 26.5% by weight of conjugated diolefins and 11.2% by weight of unsaturated aromatics) was polymerized at 30° C. for 5 hours after adding dropwise 0.7% by weight, based on the starting mixture, of a boron trifluoride/phenol complex as a cataylst. The catalyst was decomposed with an aqueous solution of sodium hydroxide. The product was washed with water, and distilled to afford a petroleum resin having an iodine number of 115 and a softening point of 30° C. in a yield of 38% by weight based on the petroleum resin.

100 parts by weight of the resulting petroleum resin was reacted with 70 parts by weight of 40% peracetic acid at 20° C. for 3 hours to afford an epoxidized petroleum resin containing 1.9% of oxirane oxygen.

Dioctylamine (24 parts by weight) was added to 100 parts of the epoxidized petroleum resin, and in the same way as in Example 4, a petroleum resin containing a tertiary amino group and a hydroxyl group was synthesized.

20 g of the petroleum resin containing a tertiary amino group and a hydroxyl groups and 80 g of the polybutadiene (D") containing a tertiary amino group and a hydroxyl group synthesized in Example 5 were dissolved in 20 g of ethylene glycol dimethyl ether. The solution was neutralized with acetic acid to afford a clear electrodepositing solution having a solids concentration of 12% by weight.

The electrodeposition solution was electrodeposited on a test panel treated with Bondelite No. 137 as a cathode by applying a voltage of 65V for 3 minutes. The coating was baked at 190° C. for 30 minutes. A smooth clear coating free fron "sagging" was obtained. The coating had good adhesion and high hardness expressed by its pencil hardness of 2H. It showed an Erichsen value of 7 mm and an impact resistance value of 50 cm.

EXAMPLE 10

Liquid polybutadiene (F) having a 1,2-bond content of 58%, a number average molecular weight of 800 and a viscosity at 25° C. of 7 poises, which was synthesized using benzyl sodium as a catalyst, was epoxidized with peracetic acid to afford epoxidized polybutadiene (F') having an oxirane oxygen content of 3.0% by weight.

A 2-liter separable flask equipped with a reflux condenser was charged with 1,000 g of the epoxidized polybutadiene (F'), 114 g of monoethanolamine and 20 g of phenol, and they were reacted at 160° C. for 6 hours under a stream of nitrogen. The unreacted matter was distilled off under reduced pressure to afford amino-containing polybutadiene (F") having an amine value of 90 and a viscosity at 25° C. of 350 poises.

300 g of the amino-containing polybutadiene (F") was dissolved in 60 g of butyl "Gellosolve", and neutralized with 15.4 g of acetic acid. Deionized water was added to afford an aqueous solution having a solids concentration of 30% by weight.

600 g of the 30% by weight aqueous solution, 650 g of titania, 24 g of carbon black, 24 g of strontium chromate, 100 g of aluminum silicate, and 1,000 g of glass beads were placed in a 2-liter stainless steel beaker, and wer vigorously stirred for 2 hours by a high-speed rotary mixer. The glass beads were separated by filtration, to afford a pigment paste (A') having very good water-dispersibility.

EXMPLE 11

Liquid polybutadiene (G) having a 1,2-bond content of 63%, a number average molecular weight of 1,400 and a viscosity at 25° C of 60 poises, which was synthesized by using benzyl sodium as a catalyst, was epoxidized with peracetic acid to afford epoxidized polybutadiene (G') having an oxirane oxygen content of 3.5% by weight.

A 1-liter separable flask equipped with a reflux condenser was charged with 200 g of the epoxidized polybutadiene (G'), 40 g of butyl "Cellosolve", 26.7 g of monoethanolamine and 7.9 g of water as a reaction promotor, and they were reacted at 130° C. for 6 hours under a stream of nitrogen. Under reduced pressure, the unreacted monoethanolamine, butyl "Cellosolve" and water were distilled off to afford amino-containing polybutadiene (G") having an amine value of 81.7 (mg/g-KOH).

100 g of the amino-containing polybutadiene (G") was dissolved in 20 g of butyl "Cellosolve", and neutralized with 5.2 g of acetic acid. Deionized water was added to afford an aqueous solution having a solids concentration of 20% by weight. The aqueous solution was clear and had good storage stability.

63.1 g of the pigment paste (A') produced in Example 10 was added to the 20% by weight aqueous solution and the mixture was fully stirred. Deionized water was then added to afford an electrodepositing paint solution having a solids concentration of 12% by weight.

The paint solution was electrodeposited on a mild steel panel (treated with Bondelite No. 3114; the product of Nippon Test Panel Co., Ltd.; size 0.6 × 70 × 150 mm) as a cathode. The results are shown in Table 3.

EXAMPLE 12

200 g of the epoxidized polybutadiene (G') used in Example 11 was put into a 1-liter separable flask equipped with a reflux condenser, and 40 g of butyl "Cellosolve", 2 g of phenol, and 21.4 g of monoethanolamine were added. They were reacted at 150° C. for 2.5 hours. Under reduced pressure, the butyl "Cellosolve" and the unreacted monoethanolamine were distilled off to afford amino-containing polybutadiene (H") having an amine value of 44.7 (mg/g-KOH).

100 g of the amino-containing polybutadiene (H") was dissolved in 20 g of butyl "Cellosolve", and neutralized with 2.9 g of acetic acid. Deionized water was then added to prepare an aqueous solution having a solids concentration of 20% by weight. The aqueous solution was opalescent, but fully stable.

63.1 g of the pigment paste (A') produced in Example 10 was added to the 20% by weight aqueous solution, and the mixture was fully stirred. Deionized water was then added to afford an electrodepositing paint solution having a solids concentration of 12% by weight.

The paint was electrodeposited on a mild steel panel treated with Bondelite No. 3114 (the product of Nippon Test Panel Co., Ltd.; size 0.6 × 70 × 150 mm) as a cathode using a carbon electrode as an anode. The results are shown in Table 3.

EXAMPLE 13

Liquid polybutadiene (J) having a 1,2-bond content of 60%, a number average molecular weight of 1,000 and a viscosity at 25° C. of 15 poises, which was synthesized by using benzyl sodium as a catalyst, was epoxidized to afford epoxidized polybutadiene (J') having an oxirane oxygen content of 3.6% by weight.

A 1-liter separable flask equipped with a reflux condenser was charged with 200 g of the epoxidized polybutadiene, 40 g of butyl "Cellosolve", 26.7 g of monoethanolamine, 8 g of a reaction promotor and 0.75 g of acetic acid. They were reacted at 145° C. for 8 hours under a stream of nitrogen. Under reduced pressure, the unreacted monoethanolamine and butyl "Cellosolve" were distilled off to synthesize amino-containing polybutadiene (J'') having an amine value of 78.0.

100 g of the amino-containing polybutadiene (J'') was dissolved in 20 g of butyl "Cellosolve", and neutralized with 5.0 g of acetic acid. Deionized water was then added to afford an aqueous solution having a solids concentration of 20% by weight. Then, by the same method as in Example 1, pigments were added and the mixture diluted with deionized water to afford an electrodepositing paint solution having a solids concentration of 12% by weight.

In the same way, the paint solution was electrodeposited on a cathode. The results are shown in Table 3.

EXAMPLE 14

200 g of the epoxidized polybutadiene (G') used in Example 11, 40 g of butyl "Cellosolve", 56 g of n-octylamine and 4 g of phenol as a reaction promotor were reacted at 160° C. for 4 hours under a nitrogen stream. The unreacted amine and butyl "Cellosolve" were distilled off to afford amino-containing polybutadiene (K'') having an amine value of 90.

100 g of the amino-containing polybutadiene (K'') was dissolved in 20 g of butyl "Cellosolve", and neutralized with 5.8 g of acetic acid. Deionized water was added to afford an aqueous solution having a solids concentration of 20% by weight. In the same way as in Example 11, pigments were added, and the mixture diluted with deionized water to afford an electrodepositing paint solution having a solids concentration of 12% by weight. In the same way as in Example 11, the electrodepositing paint was electrodeposited on a cathode. The results are shown in Table 3.

Table 3

| Example | 11 | 12 | 13 | 14 |
|---|---|---|---|---|
| Coating conditions | | | | |
| Voltage (V) | 150 | 75 | 100 | 200 |
| Time (minutes) | 3 | 3 | 3 | 1 |
| Baking conditions | | | | |
| Temperature (° C.) | 200 | 180 | 200 | 190 |
| Time (minutes) | 30 | 30 | 30 | 30 |
| Coating thickness (microns) | 25 | 20 | 30 | 20 |
| Physical tests | | | | |
| Pencil hardness | 3H | HB | 2H | H |
| Sketching | Good | Good | Good | Good |
| Crosscut test (tape test) | 100/100 | 100/100 | 98/100 | 98/100 |
| Erichsen (mm) | >9 | >9 | >9 | >9 |
| Impact strength (cm) | | | | |
| Top surface | >50 | >50 | >50 | >50 |
| Back surface | >50 | >50 | >50 | >50 |
| Flexural resistance (mm) | <2 | <2 | <2 | <2 |
| Chemical tests | | | | |
| Alkali resistance (hours) | >150 | 100 | >150 | >150 |
| Acid resistance (hours) | 100 | 50 | 100 | 100 |
| Solvent resistance (days) | >30 | >30 | >30 | >30 |
| Water resistance (days) | >30 | >30 | >30 | >30 |
| Corrosion resistance (mm)* | 1 | 5 | 2 | 3 |

*The maximum rust width from a cut portion provided in the coating (a spray of a 5% aqueous solution of NaCl, 200 hours)

What we claim is:

1. A process for producing a cathode-precipitating electrodeposition coating composition, which comprises reacting (A) an unsaturated organic compound having a molecular weight of 300 to 30,000 containing a carbon-carbon double bond in an amount corresponding to an iodine number of 50 to 500, said unsaturated organic compound being selected from the group consisting of (a) a polymer of a conjugated diolefin containing 4 to 8 carbon atoms, (b) a copolymer of at least two conjugated diolefins containing 4 to 8 carbon stoms, (c) a copolymer of at least one conjugated diolefin containing 4 to 8 carbon atoms and a vinyl monomer having ethylenic unsaturation containing 2 to 20 carbon atoms, (d) a natural oil, (e) a natural fat and (f) a petroleum resin produced by cationic polymerization of petroleum cracking fractions containing 4 to 10 carbon atoms with a Friedel-Crafts catalyst, said unsaturated organic compound having bonded thereto, through a carbon-carbon bond, epoxy groups of the formula

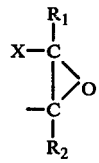

wherein $R_1$ and $R_2$, independently from each other, represent hydrogen or methyl, and X represents hydrogen or a bond, and when X is a bond, the carbon atom to which $R_1$ is attached and the carbon atom to which $R_2$ is attached both may form a part of the main chain of said component (A), the amount of said epoxy groups in said component (A) being 0.05 to 0.2 mole per 100 g of said component (A), with (B) a primary or secondary amine compound of the formula

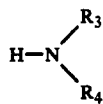

wherein $R_3$ and $R_4$ are the same or different hydrocarbon groups containing 1 to 10 carbon atoms, and either one of $R_3$ and $R_4$ may be a hydrogen atom, at a temperature of 100 to 200° C. to form a resinous substance containing basic groups and hydroxy groups, adding a water-soluble inorganic or organic acid to the resinous substance to render the resinous substance water-soluble, and mixing the resulting water-soluble resinous substance with an aqueous or organic liquid medium; or performing the above reaction in the presence of the liquid medium.

2. The process of claim 1 wherein said unsaturated organic compound is an oil selected from the group consisting of linseed oil, tung oil, soybean oil, dehydrated castor oil and stand oil.

* * * * *